United States Patent [19]

Schmitt et al.

[11] Patent Number: 4,476,015

[45] Date of Patent: Oct. 9, 1984

[54] MULTIPLE ELEMENT FLUID SEPARATION DEVICE

[75] Inventors: Richard P. Schmitt; Vincent J. Ciccone, both of Alexandria; William P. Gardiner, Springfield, all of Va.

[73] Assignee: V. J. Ciccone & Associates, Inc., Woodbridge, Va.

[21] Appl. No.: 438,579

[22] Filed: Nov. 2, 1982

[51] Int. Cl.³ .......................................... B01D 31/00
[52] U.S. Cl. .................................. 210/93; 210/323.1; 210/433.2
[58] Field of Search ............... 210/321.5, 323.1, 494.1, 210/91, 85, 433.1, 433.2, 93

[56] References Cited

U.S. PATENT DOCUMENTS

| | | | |
|---|---|---|---|
| 3,392,840 | 7/1968 | Clark et al. | 210/321 |
| 3,430,770 | 3/1969 | Clark et al. | 210/321 |
| 3,485,374 | 12/1969 | Manjikian et al. | 210/321 |
| 3,504,796 | 4/1970 | Bray | 210/137 |
| 3,708,069 | 1/1973 | Clark | 210/181 |
| 3,774,771 | 11/1973 | Manjikian et al. | 210/321 |
| 3,880,755 | 4/1975 | Thomas et al. | 210/91 |
| 3,945,923 | 3/1976 | Rogers et al. | 210/494.1 X |
| 4,016,078 | 4/1977 | Clark | 210/94 |
| 4,083,780 | 4/1978 | Call | 210/137 |

*Primary Examiner*—Frank A. Spear, Jr.
*Attorney, Agent, or Firm*—Schwartz, Jeffery, Schwaab, Mack, Blumenthal & Koch

[57] ABSTRACT

The fluid separation device contains a plurality of fluid separation elements, each element having fluid inlet, a treatable fluid chamber, a product fluid chamber, a product fluid outlet connected to the product fluid chamber, and a concentrated fluid outlet connected to the treatable fluid chamber. The elements are divided into at least first and second stages, each of which contains a plurality of elements. A pressure vessel surrounds the elements to maintain them at an elevated pressure. A manifold is attached to the outlet end of each of the elements. The manifold has a first channel formed therein for connecting the concentrated fluid outlet of each of the elements of the first stage with the fluid inlet of each of the elements of the second stage.

23 Claims, 9 Drawing Figures

MULTIPLE ELEMENT FLUID SEPARATION DEVICE

The invention disclosed in this application was made with the support of the U.S. Federal Government, and the Federal Government has certain rights in the invention.

BACKGROUND OF THE INVENTION

1. Field of the Invention

The present invention relates to fluid separation systems using such technology as reverse osmosis, ultrafiltration, absorption and ion exchange.

2. Discussion of Related Art

The use of ultrafiltration and reverse osmosis devices for various applications is becoming increasingly more prevalent. One example of a very important use for reverse osmosis elements is the production of potable water from seawater, brackish water, and non-potable fresh waters.

Currently available reverse osmosis water purification units contain a plurality of reverse osmosis elements which are installed in modules with up to five elements contained in a series arrangement within a single pressure vessel. This requires a multiplicity of high pressure, interconnecting fittings, valves and piping. In addition, because of the numerous plumbing connections, potential points of leakage are increased, especially in equipment which must be frequently disassembled. Also, it is very difficult and possibly unlikely that an operator in the field could determine which element in a series arrangement is defective when the product water is determined to be unacceptable. As a result, two or more expensive reverse osmosis elements may be replaced when only one element or possibly even the seal on one element is the cause of the unacceptable product water.

Other configurations have been suggested. For example, U.S. Pat. No. 4,016,078 to Clark discloses a header block for tubular membrane permeator modules. The header block comprises two opposed, generally planar surfaces joined by a feed bore. The axis of the bore is perpendicular to the faces. A third generally planar surface is connected to the bore and pierced by a plurality of generally parallel feed passageways terminating in the bore. The third surface is generally parallel to the bore axis. The header block cooperates with a collector plate and an end plate to provide both feed and permeate manifolds. A plurality of modules comprising such blocks may be joined side by side with appropriate side plates and gaskets to provide either parallel or serial flow through permeator modules.

U.S. Pat. No. 4,083,780 to Call shows a fluid purification system comprising a pressure vessel containing a plurality of spiral wrap reverse osmosis membrane elements. The elements are placed in parallel within the pressure vessel to purify a given amount of fluid for a given diameter fluid purification apparatus.

U.S. Pat. No. 3,708,069 to Clark shows a reverse osmosis membrane module. The module includes an elongated tubular casing having substantial hoop length. The casing receives a plurality of elongated tubular membrane structures. Within the casing are a plurality of thin-walled tubes each surrounding and receiving an associated one of the tubular membranes.

U.S. Pat. No. 3,774,771 to Manjikian et al discloses a reverse osmosis module which contains a number of membrane elements each having a semi-permeable membrane covered outer surface. Each element is surrounded by a flow tube for controlling liquid flow over the membrane surface. The membrane elements are enclosed in a pressure resistant container with liquid under pressure filling the space between the outsides of the liquid flow control tubes and the interior surface of the pressure resistant container.

U.S. Pat. No. 3,485,374 to Manjikian et al. discloses a reverse osmosis module which contains a bundle of backing tubes having cast-on end flanges. The backing tubes are lined with semi-permeable membranes. Strong wrappings are placed around the ends of the bundle of tubes and are embedded in cast end flanges. An outer tube to collect product water surrounds the membrane tube bundle and is attached at its ends to the end flanges, and module end plates may be joined to connect modules in series.

U.S. Pat. No. 3,392,840 to Clark et al. discloses a reverse osmosis module which includes a porous body having a number of longitudinal bores lined with semi-permeable membranes. The body is provided with end flanges, end plates and interposed seals. Channels are formed in the body to connect the end of one bore with a pipe supplying solution to be treated under pressure, to connect the end of another bore with a pipe for concentrate exhaust, and to connect the ends of other bores to form a continuous passageway through the body.

U.S. Pat. No. 3,430,770 to Clark et al. discloses a reverse osmosis module comprising a number of backing tubes containing tubular membranes arranged in side-by-side relationship. Flanges, preferably of plastic, are cast around the ends of the tubes and these flanges contain flared bores communicating with the tube bores and which are overlaid with flared membrane ends. End plates containing connecting channels are fastened to the flanges with O-ring seals between the end plates and the flared membrane ends.

SUMMARY OF THE INVENTION

One object of the present invention is to provide a device which permits a multiplicity of fluid separation elements for the treatment of fluids.

Another object of the present invention is to provide a multi-element fluid separation device which provides improved packaging density for such systems as a reverse osmosis water purification unit.

Another object of the present invention is to provide a multi-element fluid separation device which is light in weight and of a relatively small size so that it can be transported easily.

A further object of the present invention is to provide a multi-element fluid separation device which contains a plurality of elements such as reverse osmosis elements, ultra-filtration, and others, each of which can be easily tested for individual product fluid quality, without disturbing or removing any of the other elements.

A still further object of the present invention is to provide a multi-element fluid separation device in which fouled or defective elements can be quickly identified and replaced without having to replace or disturb any of the other elements or disconnect external piping.

Yet a still further object of the present invention is to provide a multi-element fluid separation device in which each separation element in the device is equally accessible.

Another object of the present invention is to provide a device so designed and constructed that any of the separation elements used could be inserted in either direction without affecting performance of the element.

An even still further object of the present invention is to provide a multi-element fluid separation device which permits incorporation of a varying number of elements in order to improve the element performance characteristic and improve fluid treatment efficiency.

In accordance with the above and other objects, the device of the present invention comprises a plurality of fluid separation elements contained within a pressure vessel.

In accordance with other aspects of the invention, the pressure vessel can either be a single container surrounding all of the elements or it can be in the form of a separate container associated with each of the elements. The pressure vessel surrounds the element(s) to maintain the element(s) at an elevated pressure. The pressure vessel together with a specially designed manifold of this invention divides the elements into at least first and second stages, each stage containing a plurality of elements. The manifold of this invention is attached to the outlet end of each of the elements. The manifold may contain a first channel formed therein for connecting the concentrated outlet of each of the elements of the first stage with the treatable fluid inlet of the elements of the second stage. The manifold contains a fluid inlet which provides pressurized treatable fluid to an inlet of each of the elements of the first stage. The construction is such that the elements of the first stage may be connected in parallel relationship to each other to receive treatable fluid and discharge concentrated fluid and product fluid. The first stage is connected in series to the second stage to transfer the concentrated fluid to the second stage through channels in the manifold. The second stage elements are connected in parallel to each other to further remove product fluid from the concentrated fluid.

The manifold provides a channel for the fluid inlet to the first stage elements. The channels of the manifold define a flow area extending to the inlet end of the associated element. The flow areas from the first stage are connected to the second stage elements by a second channel in the manifold.

The manifold also includes recesses for receiving the pressure vessel(s) and associated elements. Each recess contains at least one gasket seal for sealing an end surface of the received element.

The manifold can be formed in at least two planes with the second channel being formed in one of the planes and the first channel being formed so as to extend to both of the planes.

The assembled device of this invention also includes structure which allows for the sampling of the product in each of the product chambers. The sampling structure comprises a sampling channel formed in either end of an element.

The pressure vessel also includes a removable end cap which is disposed over the inlet end of each of the elements. The end cap includes a plurality of plugs which contact individual ones of the elements for holding the elements in forced engagement against the manifold.

The device can be produced with a plurality of stages in which each stage contains fewer elements than the previous stage. In this manner, the flow rate and pressure in each of the elements can be maintained at levels to insure best fluid flow conditions.

BRIEF DESCRIPTION OF THE DRAWINGS

The above and other objects of the present invention will become more readily apparent as the invention is more fully set forth in the detailed description to follow, reference being had to the accompanying drawings in which like reference numerals represent like parts throughout and in which.

DETAILED DESCRIPTION OF THE PREFERRED EMBODIMENT

Figure 1:
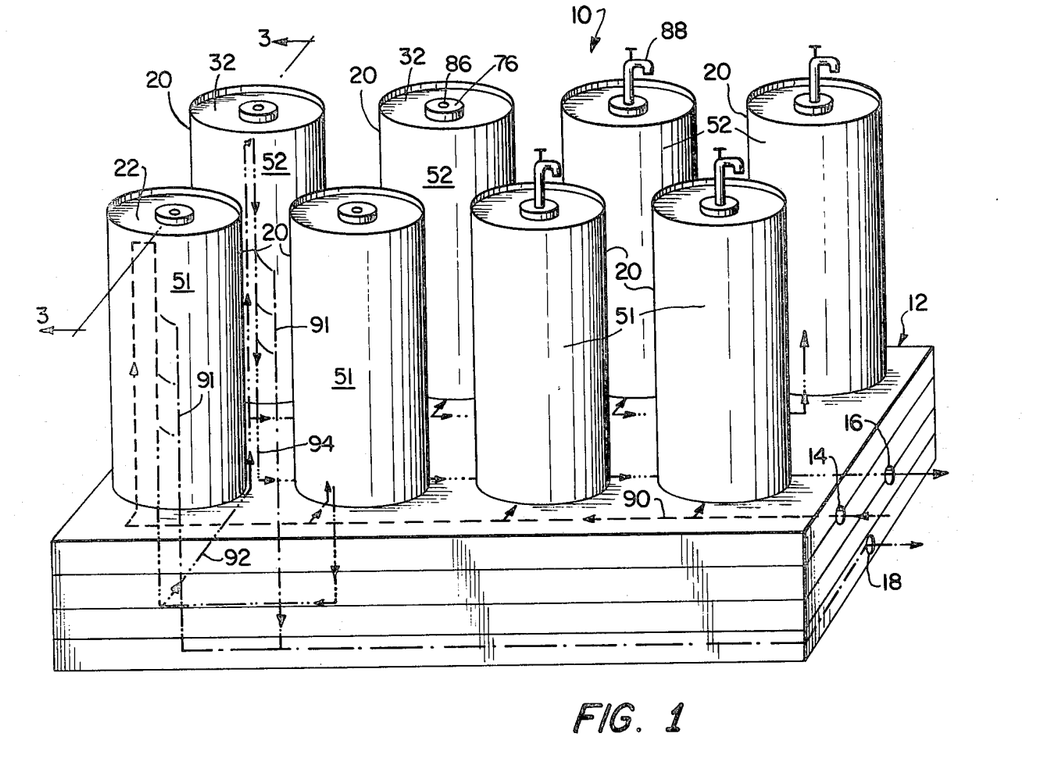
FIG. 1 is a perspective view of a multi-element fluid separation device of the present invention.

FIG. 1 shows a multi-element fluid separation device using spiral wound reverse osmosis elements 10 as an example of the present invention. Device 10 includes a manifold 12 having a contaminated fluid inlet 14, a concentrated fluid outlet 16, and a product fluid outlet 18. Manifold 12 mounts a plurality of pressure container structures 20 each of which houses a single reverse osmosis element. Each pressure container structure 20 includes a removable end cap 32 which mounts a plug 76. Each plug 76 includes a channel 78 connected to a sampling valve 88 through which product water in the reverse osmosis elements can be sampled.

Figure 3:
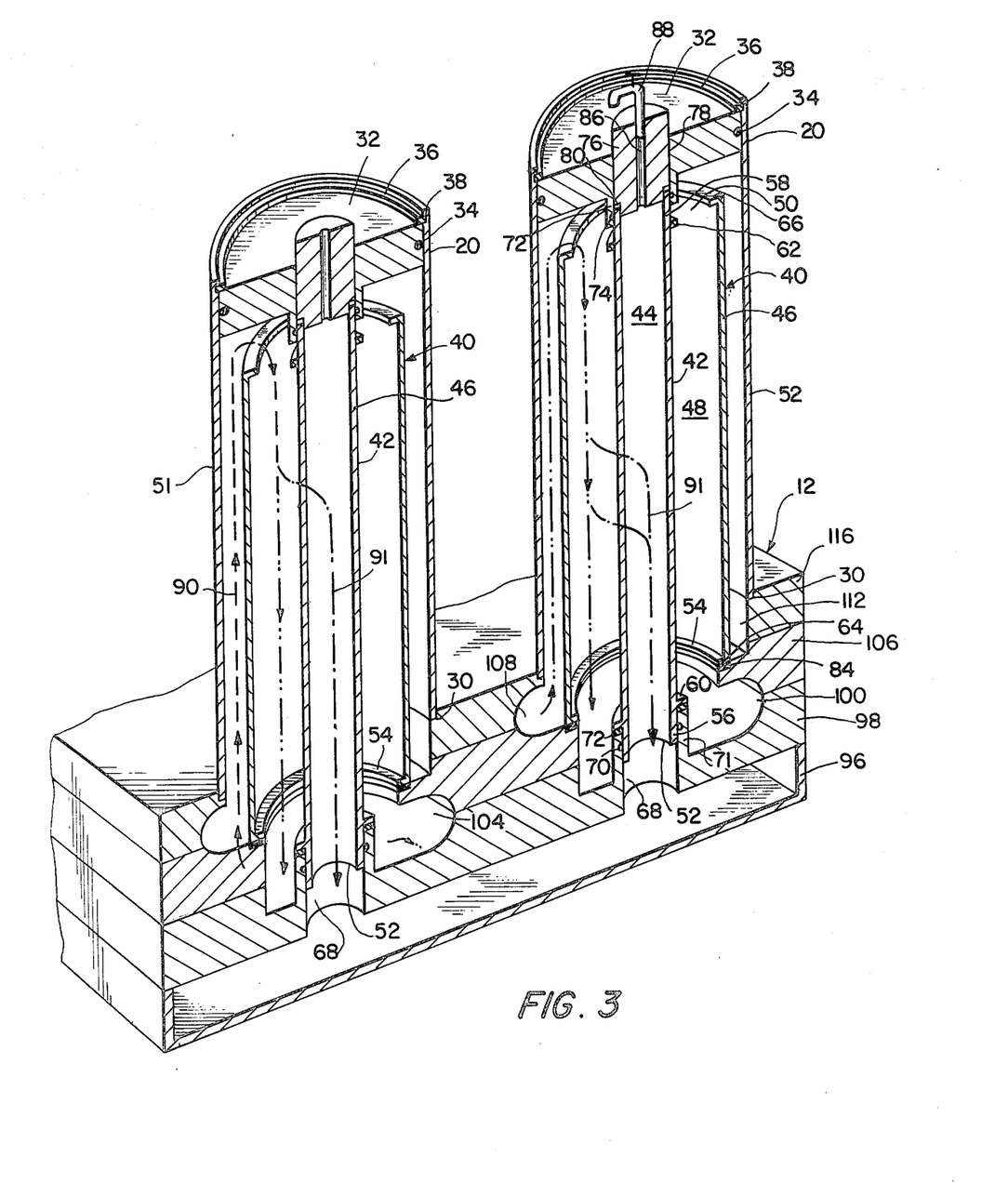
FIG. 3 is an elevational sectional view taken through section line 3—3 of FIG. 1.
Figure 9:
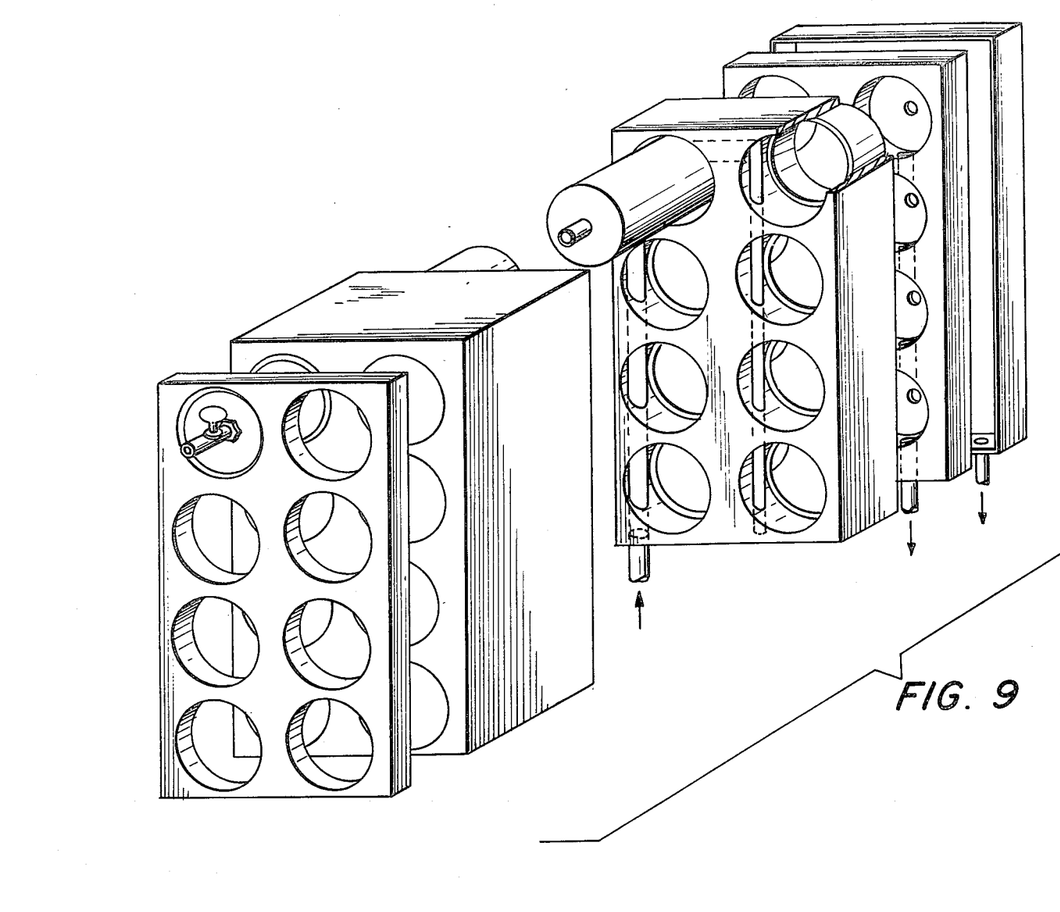
FIG. 9 is a perspective exploded view of an embodiment of the present invention using a set of bored cylinders from a single block to form the required pressure vessel.

With reference to FIGS. 1 and 3, it will be seen that each pressure container structure 20 is generally cylindrical in shape and received in a recess 30 formed in manifold 12. Container structure 20 can be welded, screwed, or connected to recess 12 in any suitable manner. With reference to FIG. 9 the manifold 12 and container structures 20 can be formed as a unitary unit such as having the top layer of manifold 12 and the container structures 20 bored out of a solid piece of metal, plastic or the like.

The top of each container structure 20 is closed by the associated removable end cap 32. End caps 32 contain seals 34 which matingly seal against the inner surface of the associated container structure 20. Seals 34 can be conventional O-rings or the like. Each end cap 32 slides within the associated container structure 20 and is held therein by a locking device 36 which is received in a groove 38 formed in the associated container structure 20.

Within each container structure 20 there is mounted a reverse osmosis element 40. Each reverse osmosis (RO)

element 40 is a conventionally available unit such as that shown in U.S. Pat. No. 3,504,795 to Bray. Each RO element includes a tube 42 which defines a purified product chamber 44 therein. A casing 46 surrounds tube 42 and defines a treatable fluid chamber 48 between itself and the associated tube 42. As viewed in FIG. 3, the inlet end of RO element 40 is at the top. Casing 46 is open at the inlet end to define a treatable fluid inlet 50 which receives fluid to be purified. The fluid enters treatable fluid chamber 48 under a pressure of approximately 1,000 psi. Tube 42 may be a spiral wound reverse osmosis member which separates purified fluid from the treatable fluid. The purified fluid passes through the spiral wound tube 42 into product chamber 44.

The lower end of reverse osmosis element 40 is the outlet end and contains a product water outlet 52 formed by the open bottom portion of tube 42. A concentrated fluid outlet 54 is formed by the open bottom portion of casing 46. Accordingly, purified product in product chamber 44 passes out of product outlet 52 and the fluid in the bottom of chamber 48, which is now concentrated due to the higher level of solutes in the fluid by virtue of the fact that the purified fluid in chamber 44 has been removed, passes out of the reverse osmosis element 40 through outlet 54.

The module of the present invention is designed so that reverse osmosis elements 40 can be easily removed and replaced in the event of fouling or a defective element. Each element 40 has symmetrical ends and can be oriented so that either end acts as the inlet or outlet end. Tube 42 has protruding ends 56 and 58 and circular flanges 60 and 62. Casing 46 has opposed flanges 64 and 66. Manifold 12 contains a product outlet channel 68 for each of the RO elements 40. Channel 68 receives extension 56 slidably therein and seals against the extension 56 by O-ring seal 70. A second seal 72 is positioned on the top of the portion of manifold 12 forming outlet channel 68 and is wedged between the manifold surface and flange 60. The opposite extension 58 is received within a boss 72 formed in end cap 32 and sealed by O-ring 74. Plug 76 is received in mating opening 78 of the end cap 32 and presses against the upper end of extension 58. A seal 80 is positioned between the upper edge of extension 56 and plug 76. Plug 76 may be screwed into opening 78 or held therein by any other suitable means. Accordingly, by varying the position of plug 76 within opening 78, the pressure against the upper surface of tube 42 can be varied. It should be noted that tube 42 is connected directly to casing 46 by structural details of the RO element which are standard in the art but not shown directly in the drawings. Accordingly, by forcing tube 42 downwardly as viewed in FIG. 3, casing 46 is forced downwardly also. Flange 64 of casing 46 rests in a recess 82 which contains an additional seal 84. Seal 84 seals against the lower surface of flange 64 which is the lower surface of casing 46.

Accordingly, it can be seen that in order to remove any RO element in module 10, the end cap 32 for that module may be removed by removing the locking device 36 associated therewith. After end cap 32 is removed, the force holding RO element 40 within container structure 20 is removed and the RO element can simply be slid out of the container structure. A new, clean RO element can be inserted in place of the fouled element.

In order to determine which RO elements have been fouled, sampling channel 86 is provided in each of the plugs 76. A valve member 88 is connected to channel 86. Valve member 88 may be opened to permit product in product chamber 44 to flow out of the inlet end of RO element 40. In this manner, the product from each RO element can be sampled individually.

FIG. 1 shows two rows of container structures 20. The first row of container structures is labeled S1 and forms the first stage of a two-stage module. The second row of container elements is labeled S2 and forms the second stage of the module. FIG. 1 shows that the flow path for treatable fluid enters inlet opening 14 at a first level in manifold 12. This fluid enters each of the container structures 20 of stage S1. As shown in dotted lines in the leftmost stage S1 containment structure, the fluid rises in the container structure and passes through the enclosed reverse osmosis element. The product fluid flow is indicated by dot dash line 90 and passes directly downward through manifold 12 into the lowest level and out product outlet 18 formed in manifold 12. The concentrated fluid flow is shown by double dot dash line 92 which passes down to a second level in manifold 12 where it meets the concentrated fluid from the other containers 20 of stage S1. This fluid then passes upwardly to the first level in manifold 12 and enters the container structures 20 of the second stage. The product fluid flow from the second stage is shown by dot dash line 90 to continue downwardly to the third level in manifold 12 and meet the product fluid from the first stage. The concentrated fluid from the second stage is shown by triple dot dash line 94 which passes downwardly to the second level in manifold 12 and out fluid outlet 16.

In order to accommodate the fluid flow, a plurality of channels are formed in manifold 12. Referring to FIGS. 1 and 3-6, it can be seen that manifold 12 may be formed in four sections. The lowest section 96 is shown most clearly in FIG. 3 and comprises a storage container for the product fluid. Outlet 18 is formed in section 96 and allows the product fluid to exit from the manifold.

Figures 4, 5, 6:
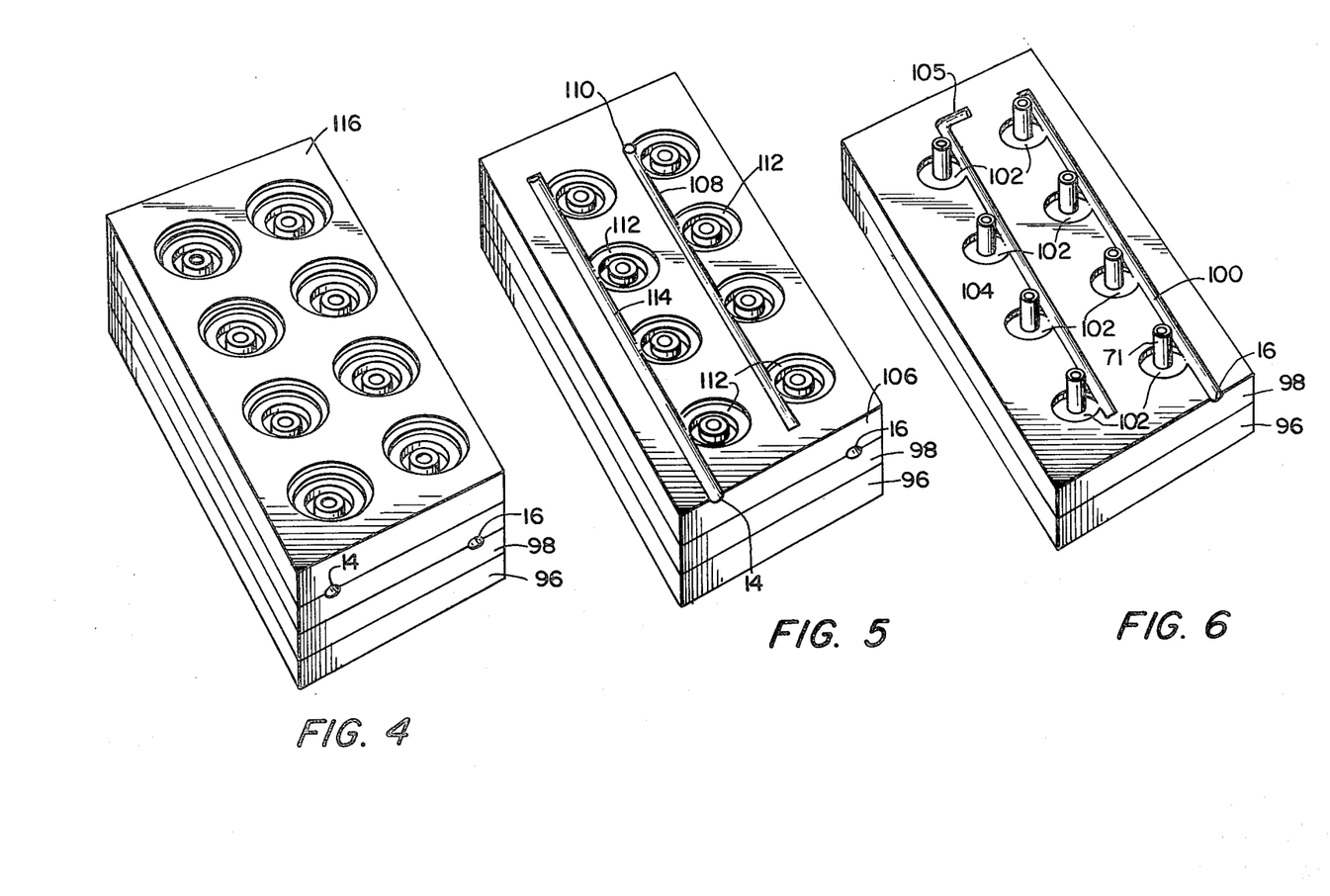
FIG. 4 is a perspective view of the manifold of the multi-element fluid separation device shown in FIG. 1.
FIG. 5 is a perspective view of the bottom three layers of the manifold of the multi-element fluid separation device of FIG. 4.
FIG. 6 is a perspective view of the bottom two layers of the manifold of FIG. 5.

Section 98 of manifold 12 is shown in FIGS. 3 and 6 to contain a concentrated fluid outlet channel 100 which connects to collection recesses 102 which are in communication, respectively, with the RO elements of the second stage. Within each collection recess 102 is a boss 71 which receives tubes 42 of the second stage elements. Also, section 98 contains collection recesses 102 for the first stage elements. However, these collection recesses are connected to a collection channel 104 which includes a laterally extending feed portion 105.

As shown in FIGS. 3 and 5, a section 106 of manifold 12 contains a concentrate feed channel 108 which communicates with concentrate feed section 105 through a vertical bore 110 in section 106. Channel 108 communicates with feed recess 112 which, as shown in FIG. 3, is formed between pressure container structure 20 and casing 46 of the RO elements in the second stage. The space between the pressure container 20 and casing 46 defines a flow path through which the inlet concentrate can be channeled to the inlet end of the enclosed RO element 40.

Similar feed recesses 112 are formed in a portion of manifold 12 receiving the RO elements of the first stage. However, these feed recesses are in communication with a feed channel 114 which communicates with inlet 14.

The third section 116 defines the upper portions of recesses 112 which include recesses 30 in which pressure container structures 20 are received.

With reference to FIGS. 1 and 3-6, it can be seen that in operation, treatable fluid to be separated is connected under high pressure to inlet 14. The treatable fluid flows through channel 114 to recesses 112 of the stage S1 elements 20. The fluid then flows up the area between container structures 20 and casings 40 of the stage S1 elements as shown by dotted lines 90 in FIGS. 1 and 3. This fluid then enters the inlets 50 of the stage S1 elements and flows downwardly through the treatable fluid chambers 48 of these elements. The separated product, as shown in dot dash lines 91 in FIGS. 1 and 3 flows into lower section 96. The concentrated fluid passes into recesses 102 of the first stage elements and into concentrated fluid collection channel 104. In FIGS. 1, 3, 4, 5 and 6, this concentrated fluid passes to feed 105 in level 98 and upwardly through bore 110 in level 106 into feed channel 108 for the second stage elements. From feed channel 108, the concentrated fluid passes into the second stage recesses 112 and upwardly within pressure container structures 20 and into the inlets of the RO elements 40 of stage S2. The product water indicated by dot dash line 91 is separated out and passes downwardly into the container of section 96. The now very concentrated fluid indicated by triple dot dash lines in FIGS. 1 and 3 enters concentrate channel 100 and exits the manifold through exit opening 16.

Clearly, the configuration described thus far provides many advantages for a reverse osmosis fluid separation device. The product fluid in any RO element can be sampled by opening valve 28 associated with that element. When the product fluid is found to be deficient, the RO element in that section can be removed and replaced very easily by simply removing the locking device 38 associated with the end cap 32 covering and holding that element in place. If it appears that one or more of the RO elements are fouled, these elements can be effectively flushed by reversing the flow through each stage of the module 10 individually with discharge of the flushing fluid to waste. This would require removal of the elements from the stages not being backflushed to prevent subsequent fouling. Another element cleaning method could be accomplished by removing the fouled element from the pressure vessel and replacing it in an inverted position—preferably in the last stage. In this manner, the inlet feed flow can also act as a flush to remove accumulated material and particles.

The use of seal 84 is also another significant feature of the present invention. Because seal 84 engages an end surface of casing 46 rather than a circumferential surface, a flat seal can be used and presents no obstacle to the current state of the art sealing technology. In addition, should limited leakage occur, there is no potential for product fluid contamination, but only leakage into the inlet concentrate water channel 108, a minimal condition of little concern. Further, pressure against seal 84 can be adjusted by movement of plug 76 which acts as a "take-up" device located within end cap 32. This plug exerts a force directly onto the seal 84 through the RO element product tube 42.

The sealing configuration of the present invention also permits the use of lower tolerances in production of the manifold than has previously been known. Accordingly, the manufacture of manifold 12 is easily compatible with today's ordinary machine shop technology. That is, fabrication of the pressure vessels 20, either metal or composite materials, including the end caps, should present no obstacle in the commercial marketplace. The manifold 12, if metal, may be easily fabricated by a series of ordinary machining operations. If constructed of a composite or epoxy, no real obstacle to fabrication is presented.

Figure 2:
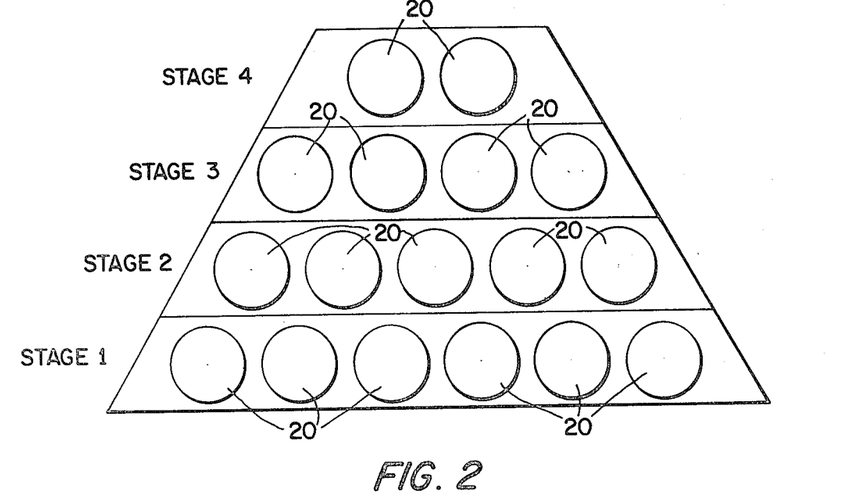
FIG. 2 is a top plan view of an alternate multi-stage configuration for the multi-element fluid separation device of the present invention.

In order to improve the dynamic hydraulic characteristics of the present invention, it may be desirable to form the manifold and pressure vessels so that a plurality of stages are present with the number of RO elements in each stage decreasing. Such a configuration is shown in FIG. 2 wherein it can be seen that the first stage contains six RO elements which are connected in parallel. The treatable fluid from stage 1 is fed in series to stage 2 which contains five parallel connected elements. The stage 2 concentrate is passed to stage 3 which contains four parallel connected elements. Finally, the concentrate from stage 3 is passed in series to stage 4 which contains only two RO elements in parallel. Accordingly, by reducing the number of RO elements per stage, the decrease in fluid volume due to the removal of product fluid in each stage is compensated for and the overall pressure and fluid velocity in the various stages can be maintained to ensure best fluid flow conditions. These conditions increase the efficiency of the RO elements and prolong the element life.

Figure 7:
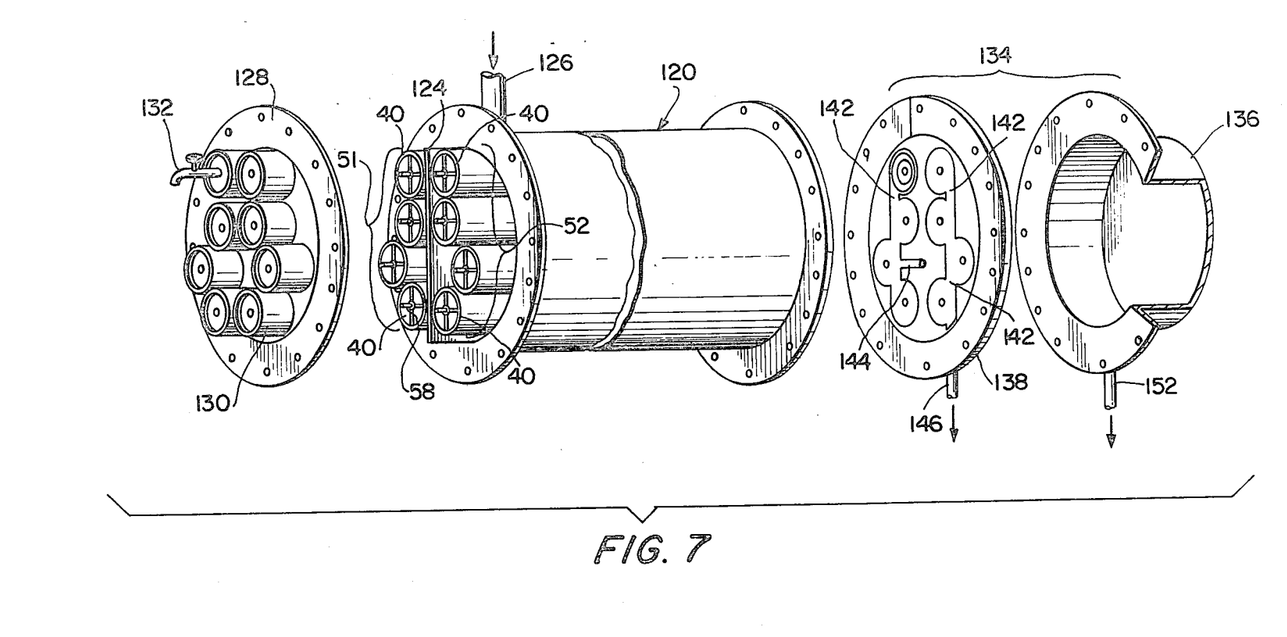
FIG. 7 is a perspective exploded view of an embodiment of the present invention using only one pressure vessel.
Figure 8:
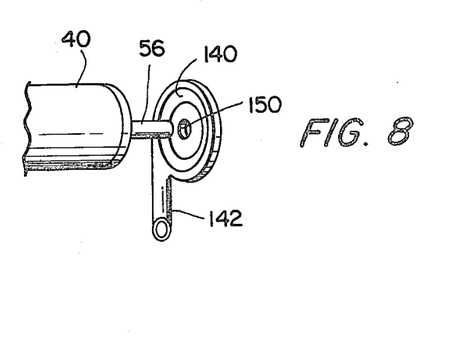
FIG. 8 is a perspective exploded view showing the interconnection of one reverse osmosis element to the manifold of FIG. 8.

Another embodiment of the present invention is shown in FIGS. 7 and 8 wherein a single pressure vessel 120 encloses a plurality of RO elements 40. The interior of pressure vessel 120 is divided by baffle 124 which segregates the elements 40 into first stage elements and second stage elements indicated by S1 and S2, respectively. A fluid inlet 126 is formed in a portion of pressure vessel 120 associated with the first stage elements.

One end of pressure vessel 120 is covered with end cap 128 which bolts to the main body of the pressure vessel to form a secure fit. End cap 128 includes a plurality of tubular extensions 130 to the pressure vessel 120 which are secured to end cap 128 and cover the ends of individual RO elements 40. Extensions 130 receive the extended ends 58 of the RO element center tubes and connect these extended ends to valves 132.

The opposite end of pressure vessel 120 is closed off by manifold 134 which comprises container section 136 and a section 138 which contains the channeling for the treatable fluid. As shown in FIG. 8, each RO element 40 seats in a recess 140 which is formed in section 138 and communicates with a collection channel 142. Collection channel 142 for the stage S1 elements connects to a feed channel 144 which extends past baffle 124 into the second stage of pressure vessel 120. The concentrated fluid then passes along the RO elements 40 and into the inlet ends of the RO elements. The concentrated fluid collected by recesses 140 of the second channel elements is passed through collection channel 142 of the second stage to concentrate outlet 146. The extended ends 56 of all of the RO elements 40 contained within pressure vessel 120 extend through openings 150 in section 138 into container 136. Product fluid received in container 136 passes from product outlet 152 for use.

Pressure vessel 120 can be cylindrical in shape as shown in FIG. 7, or can be rectangular or any other shape desired. RO elements 40 can be received within the pressure vessel and divided into any number of stages desired, depending on the shape and number of baffles 124. Naturally, manifold section 138 would have to be varied to accommodate the position and number of RO elements 40, as well as the number of stages of RO elements. Such a variation would be obvious to one of ordinary skill in the art.

A module using a single pressure vessel 120 has many of the advantages of the module 10 using a plurality of pressure vessels 20. That is, because each of the RO elements 40 can be connected to a separate valve 132, the product fluid in these RO elements can be sampled individually and only fouled or defective RO elements need be replaced when necessary. Also, because recess 140 contacts the end surface of the RO elements 40, a flat seal can be used in this recess rather than a circumferential seal. Also, fouled elements can be backflushed by removing the operative elements and reversing the position of the fouled elements within the container structure.

The foregoing description which is predicated on the use of spiral wound reverse osmosis elements is meant to be illustrative of the present invention but is not considered to prohibit the use of other equivalent fluid treatment elements or limit the scope of the invention in any way. Clearly, numerous modifications, additions and other changes can be made to the present invention without departing from the scope thereof as set forth in the appended claims.

What is claimed as new is:

1. A multi-element fluid separation device comprising:
    a plurality of fluid separation elements, each element having a treatable fluid inlet end with a treatable fluid inlet, a treatable fluid chamber, a product fluid chamber, and an outlet end having a product fluid outlet connected to said product fluid chamber, and a concentrated fluid outlet connected to said treatable fluid chamber, said elements being divided into at least first and second stages, each stage containing a plurality of elements;
    pressure vessel means surrounding said elements to maintain said elements at an elevated pressure, said pressure vessel means including at least one pressure vessel having first and second ends;
    manifold means attached to each of said elements only at said outlet end of each of said elements, said manifold means being connected to said pressure vessel only at one end of said pressure vessel, and having a first channel formed therein for connecting the concentrated fluid outlet of each of the elements of the first stage with the treatable fluid inlet of each of the elements of the second stage;
    fluid inlet means for supplying pressurized treatable fluid to the treatable fluid inlet of each of the elements of the first stage;
    whereby the elements of the first stage are connected in parallel relationship to each other to receive treatable fluid and discharge concentrated fluid and product fluid, the first stage is connected to the second stage in series to transfer the concentrated fluid to the second stage through the manifold, and the second stage elements are connected in parallel to each other.

2. The device of claim 1, wherein the pressure vessel means comprises a cylindrical member surrounding all of said elements.

3. The device of claim 1, wherein the pressure vessel means comprises a separate container associated with each of the elements.

4. The device of claim 3, wherein the fluid inlet means comprises a second channel formed in said manifold, and each of said containers defines a flow area extending to the inlet end of the associated element, the flow areas of the first stage elements being connected to said second channel and the flow areas of the second stage elements being connected to said first channel.

5. The device of claim 4, wherein said manifold is formed in at least two planes, said second channel being formed in one of said planes and said first channel being formed so as to extend to both of said planes.

6. The device of claim 3, wherein said manifold means includes recesses for receiving each container and associated element.

7. The device of claim 6, wherein each recess contains at least one gasket seal for sealing an end surface of the received element.

8. The device of claim 3, wherein said pressure vessel means comprises a plurality of end caps disposed on individual containers disposed over the inlet end of the associated element.

9. The device of claim 8, wherein each end cap contains a plug extending through the end cap and contacting the associated element to force the element against said manifold to hold the element in said pressure vessel means.

10. The device of claim 1, and further including means for withdrawing a sample of product fluid individually from each element.

11. The device of claim 10, wherein said sampling means comprises a sampling channel formed in the inlet end of each element.

12. The device of claim 1, wherein said pressure vessel means includes a removable end cap disposed over the inlet end of each of said elements for individual removal of said elements.

13. The device of claim 12, wherein said end cap includes a plurality of adjustable plugs contacting individual ones of said elements for holding said elements in forced engagement against said manifold.

14. The device of claim 1, wherein said stage contains a different number of elements.

15. The device as set forth in claim 14, wherein said first stage contains more elements than said second stage.

16. An integral manifold for use in a multi-element fluid separation device, comprising:
    a first portion having a plurality of element receiving recesses, said recesses being divided into at least a first group and a second group;
    a second portion connected to said first portion and containing a pluraliry of inlet recesses associated respectively with said element receiving recesses, and containing a first channel connecting the inlet recesses of said first group together, and a second channel connecting the inlet recesses of the second group together; and
    a third portion co-nected to said second portion and containing collection recesses associated respectively with said element receiving recesses, and containing a third channel connecting the collection recesses of said first group together, and a fourth channel connecting the collection recesses of said second group together; and
    wherein said second and third portions define a fifth channel connecting said second channel to said third channel.

17. The manifold as set forth in claim 16, wherein said first and second channels are disposed in a first plane, and said third and fourth channels are disposed in a second plane spaced from said first plane.

18. The manifold as set forth in claim 16, and further including an outlet port associated with each of said element receiving recesses.

19. The manifold as set forth in claim 18, wherein each outlet port extends through said first, second and third portions.

20. The manifold as set forth in claim 16, wherein said element receiving recesses are parallel to each other.

21. The manifold as set forth in claim 16, and further including an element seal associated with each of said element receiving recesses, each element seal having a generally planar sealing face exposed for contact with a mating face of an element.

22. A multi-element fluid separation device, comprising:

a plurality of fluid separation elements, each element having a treatable fluid inlet end with a treatable fluid inlet, a treatable fluid chamber, a product fluid chamber, and an outlet end having a product fluid outlet connected to said product fluid chamber, and a concentrated fluid outlet connected to said treatable fluid chamber; said elements being divided into first stage elements and second stage elements;

pressure chamber means for pressurizing said elements, said pressure chamber means including at least one pressure vessel having first and second ends;

manifold means for directing fluid flow from said concentrated fluid outlet of said first stage elements to said treatable fluid inlet of said second stage elements, said manifold means including recesses to receive, respectively, said elements, each said recess including seal means for sealing the concentrated fluid outlet of the respective element, each seal means including a generally planar surface engaging an end surface of the respective element, said manifold means being connected to said pressure vessel only at said first end; and an end cap means connected over said second end of said pressure vessel for enclosing said second end.

23. The device of claim 22, wherein said elements are positioned parallel to each other and disposed side by side.

* * * * *